United States Patent Office 3,523,918
Patented Aug. 11, 1970

3,523,918
METHOD OF FABRICATION OF MOLDED PARTS OF POLYURETHANE FOAM HAVING A NON-CELLULAR SURFACE LAYER
Georges Gonzalez, Paris, France, assignor to Société Quillery, La Garenne-Colombes, France
No Drawing. Continuation-in-part of application Ser. No. 619,189, Feb. 28, 1967. This application Feb. 12, 1968, Ser. No. 704,549
Claims priority, application France, July 31, 1964, 983,926; Apr. 7, 1965, 12,247, 12,248; Mar. 2, 1966, 51,617
Int. Cl. C08g 22/46
U.S. Cl. 260—2.5   35 Claims

ABSTRACT OF THE DISCLOSURE

Process by producing molded parts of polyurethane foam structure by pouring into a mold a single liquid which has just been obtained by admixture of constituents which carry at least two NCO terminations, constituents which carry at least two labile hydrogen atoms reactive with the constituents carrying NCO, to produce elastic, flexible, impermeable parts having good resistance to tear and plastic deformation, a compact surface and a cellular internal structure.

CROSS REFERENCE TO RELATED APPLICATIONS

This application is a continuation-in-part of copending U.S. application Ser. No. 619,189 filed Feb. 28, 1967, which in turn is a continuation-in-part of copending U.S. application Ser. No. 473,838 filed July 21, 1965; and, this application is also a continuation-in-part of copending U.S. application Ser. No. 485,874, filed Sept. 8, 1965. Application Ser. Nos. 473,838 and 485,874 are now abandoned.

This invention is concerned with manufacture of molded parts of polyurethane foam which have a compact or essentially noncellular outer skin surface whilst the interior is of cellular structure. This invention demonstrates that such parts can be obtained from a single foaming formulae having a base on the one hand of long-chain polyols and on the other hand of polyisocyanates, quasi-prepolymers, or prepolymers.

In carrying out the process there is substituted for parts of the long chain polyols at least one short chain polyfunctional product containing at least two active hydrogens.

It has been found that in order to satisfactorily carry out the process and obtain the desired products the following characteristics are necessary:

(1) The polyfunctional product, which will be designated hereinafter as a short chain product or short link, should carry at least two labile or active hydrogens, that is to say either a polyol, a polyamine, an aminated polyol, an amine-alcohol, an amino-acid, an amino-phenol, or even water (preferably however water is not used); and said product should have a maximum equivalent weight per labile function of 200 g., and said product should react actively with the NCO functions of the isocyanates or of the prepolymers, and the aforesaid short link product may carry if necessary either one or a number of nuclei per molecule;

(2) The molecules of the long chain polyols or other labile H carriers should wear at their linking ends or be linked during the reaction by groups of at least 6 nuclei, preferably aromatic nuclei;

(3) The equivalent weight of the total amount of polymer should be comprised between 300 and 800 g. per nucleus or, in other words, there should exist at least one nucleus per 800 g. of weight of the product and a maximum of one nucleus per 300 g.;

(4) The equivalent weight of the components of the final polymer per reactive position between free NCO and labile H should be comprised between approximately 200 and 800 g. and preferably between 400 and 600 g.;

(5) The long-chain polyols or other long-chain labile hydrogen carriers such as polyamines, amino-alcohols, aminated polyols, amino-acids, amino-phenols should have an equivalent weight per labile hydrogen function which is greater than 750 g., and preferably comprised between 750 and 2500 g., and be present in the general formula in respect of 5 to 40% of the total NCO groups (that is to say the total amount of NCO's which remain free, added to those which have already been combined at the time of preparation of the prepolymers);

(6) The short-chain products or short links which carry labile hydrogens as hereinabove defined are present in the general formula in remaining amounts of 95 to 60% of the total NCO's, the water content not exceeding 25% and being preferably comprised between 0 and 10% of the total NCO's.

The short chain polyfunctional product for example may be any one or more of the following: 4,4'-methylene-bis-ortho-chloroaniline (MOCA); diaminophenylsulfone; dichlorobenzidine; phenylethanol-amine; Caradol 520; ortho-nitroparaphenylene diamine; ethylene glycol; neopentylglycol; butyl tartrate; diethylene glycol; thiodiethylene glycol; trihydroxy-ethyl ether of glycerol; 4,4'-(2-hydroxyisopropoxy) phenyl-methane; 1,2,3-hydroxypropoxy propane; trihydroxy methyl amino methane; dianisidine; 2 - ethyl-1,3-hexanediol; tri(hydroxymethyl) amino-methane; ethylaminoethanol; propylene glycol-1,2; 4- chloro-orthoaminophenol; and, 3-amino-2-methyl-1-propanol.

The nuclei of the linking group, the ends of which are often nuclei derived from a cyclic polyisocyanate, are derived in the case of the others from cyclic constituents which can be isocyanates, polyamines, amino-alcohols, amino-acids, amino-phenols, etc., or other cyclic products comprising at least two NCO groups or two labile hydrogens. They can therefore be partly derived from the basic polyisocyanates and partly from the cyclic or polycyclic products mentioned above.

The product contemplated by the invention must combine flexibility, that is to say good elastic elongation, with firmness, that is to say a fairly high modulus of elasticity.

In order to obtain these characteristics, and in order to ensure flexibility, use is made of long-chain polyols, which preferably are of the polyether type, or other equally long-chain labile H carriers including the polyols known as polyesters which have an equivalent weight per labile H, namely per OH, $NH_2$, NH or like function which is preferably comprised between 750 g. and 2500 g. It is also possible to employ prepolymers or quasi-prepolymers which are obtained from polyols and polyisocyanates. It is the fairly high number of well grouped nuclei either joined together or bonded by the short links which ensures the characteristics of firmness.

In order to obtain a satisfactory product, the density of which decreases progressively from compactness at the surface skin layer to a cellular internal structure, it is necessary in particular to utilize a mixture of constituents having a fairly fast reactivity in order to prevent heat transfer processes between the interior and the surface. It is necessary to ensure that the ratio of the vapor pressure of the blowing agent or low-boiling-point liquid which is introduced in the mixture (or $CO_2$ when the operation is performed in the presence of water) to the viscosity of the product increases much more rapidly at the interior than at the surface, that is to say much faster at the point at which the reaction is adiabatic than at the point at which it is cooled by air at 20 to 50° C. or the mold at 20 to 55° C.; that is to say, finally, in order to ensure that the agent which generates gas or $CO_2$ can expand or vaporize within the interior and that it cannot vaporize in the surface layer.

It is accordingly apparent that the speed of the reaction must be fairly high in order that there should be only very few heat transfer processes between the interior and the surface in such a manner as to prevent any attenuation of the differences between the ratio of vapor pressure to viscosity in each of these two zones.

The heat formation is then fairly high and if use is made of a suitable system of catalysts, it will be possible to regulate the rate of reaction. It is by virtue of this high heat of reaction and the high rate of this reaction that benefit can be gained from the entire difference between the processes which take place at the surface and those which take place at the center.

It has also been found that the mold into which the liquid formulation is poured generally should have a useful mold wall surface temperature broadly within the range of about −10° C. to about +70° C., preferably within the range of about 20° C. to about 70° C., and in specific instances within the range of about 20° C. to about 55° C.

It is apparent that by changing over from one system of catalysts to another, it will be possible to produce a variation in the vapor pressure/viscosity ratio as a function of temperature and of time.

The characteristics of the products obtained in accordance with the invention are due to the fact that, in respect of a predetermined proportion between the long chain polyols and the groups of nuclei (per subparagraph 2 above) which are bonded by short links, it has been found preferable to group the nuclei on the one hand and the linear elements on the other hand instead of distributing the nuclei which are either isolated or not closely grouped between medium chains.

In accordance with the invention, it has been endeavored to combine the characteristics of a solid elastomer (high modulus of elasticity or resistance to compression) with those of a flexible foam (very high resilience, elongation and resistance to tear) while avoiding excessive evolution of $CO_2$ or other blowing agent but nevertheless retaining the number and spatial distribution of nuclei which are necessary for the purpose of obtaining good characteristics.

The final product characteristic of firmness (or stiffness) preferably entails a certain overall product density (grams per cubic decimeter) of at least about 50 g./dm.$^3$ up to about 500 g./dm.$^3$. The discovery has been made that a density of this order can be attained if the evolution of blowing agent, such as $CO_2$, during the reaction is not too substantial, for example that is to say if there is not an excessive quantity of water present. To convert from grams per cubic decimeter to pounds per cubic foot multiply by 0.0624.

Without any limitation being implied, there will now be given below a number of examples of compositions which are intended to form the product according to the invention.

In the following examples, the proportions of long-chain products, of polyisocyanates, of short links which carry or do not carry nuclei are given in equivalents, that is to say by weight equivalent to an active function of the molecular weight namely the —N=C=O equivalent in the case of the isocyanates and the labile hydrogen equivalent in the case of the labile H carriers including the polyols: the proportions of catalysts, of surface-active agents and of foamed products are given as parts and equivalents.

Basic principles being complied with, it will remain for those skilled in the art to choose the nature and quantity:

of volatile solvents, depending on the desired skin thickness and taking into account the temperature adopted and the desired internal density;

of surface-active agents, depending on the size and desired proportion of open cells and closed cells;

of each catalyst, with a view to ensuring that the variation of the ratio of the vapor pressure of the blowing agent to the viscosity is suitable for the purpose of providing a compact surface and a cellular internal structure, taking the other parameters into account.

In each example:

$a$ designates the number of nuclei of the linking group between polyols;

$b$ designates the equivalent weight of the final polymer per nucleus;

$c$ designates the number of reactive positions per linking group between polyols;

$d$ designates the equivalent weight of the whole components of the final polymer per reactive position between free NCO and labile H;

$e$ designates the equilvalent weight per labile H of the longer of the short links.

In the following Examples 1–26 there will be indicated only the formulae of the mixture employed, whilst the mode of preparation both of this mixture and of the foam to be obtained from said mixture are as indicated in the patent application No. 473,838 filed July 21, 1965, which is incorporated herein by reference.

The mode of preparation of the mixture and of the foam to be obtained from said mixture is set forth in the first set of Examples I, II, and III below taken from application S.N. 473,838.

EXAMPLE I

A mixture of: 1800 parts (1.2 equivalent) of polyoxypropylene-ethylene glycol/trimethylol propane of a molecular weight of 4500 (TPE 4542 of Wyandotte Chemical Co.) 375 parts (2.8 equivalent) of methylene-bis-orthochloraniline (MOCA), 38.25 parts (0.85 equivalent) of 3-amino-2-methyl-1-propanal, 4.5 parts of "Metatine" 712 (96% dibutyltin dilaurate by weight) 6.60 parts of triethylene diamine, 108 parts of monofluoro-trichloromethane, and 14.5 parts of carbon black, were prepared at room temperature.

444 parts (5.1 equivalent) of tolylene diisocyanate 80/20 (TDI 80/20) and 13 parts of silicone SI 202 were added to the above mixture within a very short time and with agitation, whereafter the mixture was immediately poured into a mold at 50 or 60° C. in which it spreads out, and forms the skinned foam product.

If desired the product may be subjected to a post cure at elevated temperature, or even at room temperature for extended periods. The post cure however is not a necessity, and this applies to the process in general.

EXAMPLE II

A mixture of 1.125 parts (0.75 equivalent) of polyoxypropylene ethylene glycol/trimethylol propane of a molecular weight of 4500 (TPE 4542); 402 parts of (3 equivalents) of methylene - bis - ortho - chloroaniline (MOCA) 9.9 parts 1.1 equivalent of water, 4.6 parts Metatine 712 (33% dibutyltin dilaurate by weight), 3.1 parts of triethylene diamine—the latter two compounds being used as conventional foaming and crosslinking catalysts—and 9.8 parts of the "Dow Corning 190" silicone surface-active agent was prepared at room temperature.

422 parts (4.85 equivalent) of tolylene diisocyanate 80/20 (TDI 80/20) was added within a very brief period and with agitation to the above mixture thereafter the resultant foaming mixture was immediately poured into a mold at a temperature between 50–60° C.

EXAMPLE III

A mixture of 150 parts (0.1 equivalent) of polyoxypropylene ethylene glycol/trimethylol propane of a molecular weight of 4500 (TPE 4542); 617 parts (0.617 equivalent) of trioxypropylene ethylene glycol/glycerine of 3000 molecular weight 172.8 parts (1.29 equivalent) of methylene-bis-ortho-chloroaniline (MOCA) 10 parts (1.1 equivalent) of water, 1.2 parts of the silicone surface active agent DC 190, 1.42 parts of triethylene diamine, 2.84 parts of tin octoate and 0.74 part of tetramethylbutane diamine was prepared at room temperature.

269.2 parts (3 equivalents) of toluylene di-isocyanate (TDI) were added to the above mixture, whereupon the foaming mixture was poured into a mold at 50 to 60° C.

The silicone surface active agents, Dow Corning 199 and Dow Corning 202, used in the above examples are silicone cell control additives for use in the formation of polyurethane foams. Dow Corning 199 has the following typical properties:

Viscosity, centistokes, at 25° C.—5500
Refractive Index—1.4435
Flash point, degrees F.—350
Specific gravity at 25° C.—1.02
Color—Straw The silicone cell control additive Dow Corning 202 has the following typical properties:

Viscosity at 77° F., centistokes—950–1050
Specific gravity at 77° F.—1.04
Refractive Index at 77° F.—1.4500
Color, Gardner Scale—1 to 6
Hydroxyl content, percent—(phthalic anhydride method)—nil
Water solubility—completely soluble
Water stability—stable in solution As mentioned hereinabove the following Examples 1–26 indicate the formulae of the mixtures employed to produce the molded polyurethane parts containing an outer skin.

EXAMPLE 1

The mixture consists of 0.66 equivalent of 4,4'-(2-hydroxyisopropoxy)diphenyl-methane (DPM), a dialcohol having 2 nuclei, 1.33 equivalent of 4,4'-methylene-bis-ortho-chloroaniline (MOCA, a diamine having 2 nuclei) and 0.1 equivalent of water, 1 equivalent of polyether polyol having mainly primary OH termination, an equivalent weight of 1300 g. and 3.2 equivalents of tolylene di-isocyanate (TDI) having 80% of 2-4 isomers and 20% of 2-6 isomers (referred to hereinafter as 80/20 TDI).

$a = 7.2$      $d = 618$
$b = 551$      $e = 185$
$c = 6.4$

The polyol above has a molecular weight of approximately 3,900 with there being three equivalents per mole.

The values for $a$, $b$, $c$, $d$ and $e$ are obtained in the following manner which exemplifies how the corresponding calculations are made in each of the following examples.

| Equivalents | Equivalent weight | | Total equiv. weight within each of each | No. nuclei linking group |
|---|---|---|---|---|
| 0.66 DPM | × | 185 = | 122 | 0.66 |
| 1.33 MOCA | × | 134 = | 178 | 1.33 |
| 0.1 H₂O | × | 9 = | 0.9 | |
| 1.0 polyol | × | 1,300 = | 1,300 | |
| 3.2 TDI | × | 87 = | 278 | 1.6 |
| | | | 1,979 | 3.59 |

(a) = 2 × 3.59 = 7.2.
(b) = 1979/3.59 = 551.
(c) = 2 × (number of NCO equivalents) = 2 × 3.2 = 6.4.
(d) = 1979/3.2 = 618.
(e) = 185 (equivalent weight of the DPM).

EXAMPLE 2

The mixture consists of: 2.06 equivalents of di-(aminophenyl)sulfone (diamine having 2 nuclei) and 0.1 equivalent of water, 1 equivalent of triol having mainly primary OH terminations, an equivalent weight of 1300 g., and 3.2 equivalents of 80/20 TDI.

$a = 7$      $d = 604$
$b = 516$      $e = 124$
$c = 6$

EXAMPLE 3

The mixture consists of: 2.06 equivalents of dichlorobenzidine (diamine having 2 nuclei) and 0.1 equivalent of water, 1 equivalent of triol having mainly primary OH terminations, an equivalent weight of 1300 g., and 3.2 equivalents of 80/20 TDI.

$a = 7$      $d = 604$
$b = 516$      $e = 126$
$c = 6$

EXAMPLE 4

The mixture consists of: 1.5 equivalent of phenyl-ethanol-amine (amino-alcohol having 1 nucleus) 2 equivalents of diethylene glycol, 0.5 equivalent of Caradol 520 having 4 OH functions, one equivalent of triol having mainly primary OH terminations, an equivalent weight of 1500 g. (molecular weight 4500 g.), 3 equivalents of 80/20 TDI, and 2 equivalents of diphenylmethane diisocyanate. Caradol 520 is a polyol having a molecular weight of approximately 432 and an equivalent weight of 108.

$a = 10$      $d = 475$
$b = 475$      $e = 136$
$c = 10$

EXAMPLE 5

The mixture consists of: 2 equivalents of orthonitro-paraphenylene diamine (diamine having 1 nucleus as nucleus carrier, 1 equivalent of triol having mainly primary OH terminations, an equivalent weight of 1666 g. (molecular weight 5000 g.) and 3 equivalents of an 88/12 mixture of methylene-bis-4,4' (phenyl isocyanate) and of methylene-bis-2,4' (phenyl isocyanate) as polyisocyanate:

$a = 8$      $d = 731$
$b = 548$      $e = 76.5$
$c = 6$

EXAMPLE 6

The mixture consists of: 3 equivalents of 4,4'-methylene-bis-ortho-chloro aniline (diamine having 2 conjugate nuclei), 2 equivalents of glycol (2 OH functions), 1 equivalent of Caradol 520 (tetrol), 1 equivalent of triol having mainly primary OH terminations, an equivalent weight of 1500 g. (molecular weight 4500 g.) and 7 equivalents of 80/20 TDI.

$a = 13+$      $d = 381$
$b = 411$      $e = 134$
$c = 14$

EXAMPLE 7

The mixture consists of: 3 equivalents of 4,4'-methylene-bis-ortho-chloroaniline, 2 equivalents of neopentylglycol (2 OH functions), the equivalent of Caradol 520 (tetrol), 1 equivalent of triol having mainly primary OH terminations, an equivalent weight of 1500 g. (molecular weight 4500 g.) and 7 equivalents of 80/20 TDI.

$a = 13$      $d = 388$
$b = 417$      $e = 134$
$c = 14$

EXAMPLE 8

The mixture consists of: 2 equivalents of butyl tartrate (2 OH functions), 1 equivalent of triol having mainly primary OH terminations, an equivalent weight of 1000 g. (molecular weight 3000 g.) and 3 equivalents of diphenyl-methane-diisocyanate as sole nucleus carrier.

$a = 6$      $d = 560$
$b = 560$      $e = 131$
$c = 6$

EXAMPLE 9

The mixture consists of: 1.5 equivalent of Caradol 520 (4 OH functions), 1.5 equivalent of diethylene-glycol, a mixture of triol/diol composed of 0.5 equivalent of triol having mainly primary OH terminations, an equivalent weight of 1500 g. (molecular weight 4500 g.) and 0.5 equivalent of polybutadiene R 45 M (diol), and 4 equivalents of 80/20 TDI.

$a=8+$     $d=395$
$b=790$     $e=108$
$c=8$

EXAMPLE 10

The mixture consists of 2 equivalents of 4,4'-methylene-bis - ortho - chloroaniline (diamine having 2 conjugate nuclei), 1 equivalent of thiodiethylene - glycol, (2 OH functions), 1 equivalent of Caradol 520 (4 OH functions) one equivalent of triol having mainly primary OH terminations, an equivalent weight of 1500 g. (molecular weight 4500 g.), and 5 equivalents of 80/20 TDI.

$a=9+$     $d=473$
$b=525$     $e=134$
$c=10$

EXAMPLE 11

The mixture consists of 2 equivalents for 4,4'-methylene-bis-ortho-chloroaniline (MOCA, diamine having two conjugate nuclei), 1 equivalent of (DEG) dimethylene-glycol, (2 OH functions), 1 equivalent of (THEG) trihydroxy-ethyl ether of glycerol (3 OH functions), 1 equivalent of triol having mainly primary OH terminations, an equivalent weight of 1500 g. (molecular weight 4500 g.) and 5 equivalents of 80/20 TDI.

In order to give another example calculation the values for $a$, $b$, $c$, $d$ and $e$ for Example 11 were determined as follows:

| Equivalents | Equivalent weight | | Total equiv. of each group | No. nuclei within each linking group |
|---|---|---|---|---|
| 2.0 MOCA | × | 134 = | 268 | 2 |
| 1 DEG | × | 45 = | 45 | 0 |
| 1 THEG | × | 74 = | 74 | 0 |
| 1 triol | × | 1,500 = | 1,500 | 0 |
| 5 TDI | × | 87 = | 435 | 2.5 |
| | | | 2,322 | 4.5 |

(a) = 4.5 nuclei per each equivalent triol×2 (sets of the nuclei per equivalent)=9.
(b) = 2322/4.5=516.
(c) = 2×(number of NCO equivalents)=2×5=10.
(d) = 2322/5=464.
(e) = 134 (equivalent weight of MOCA).

EXAMPLE 12

The mixture consists of: 2 equivalents of Caradol 520 (4 OH functions), 4 equivalents of diethylene-glycol (2 OH functions), 1 equivalent of triol having mainly primary OH terminations, an equivalent weight of 1500 g. (molecular weight 4500 g.), and 6 equivalents of an 88/12 mixture of methylene-bis-4,4'-(phenyl isocyanate), and methylene 2,4'-(phenylisocyanate) as polyisocyanate, and 1 equivalent of 80/20 TDI.

It is apparent from this example that only the isocyaates are carriers of nuclei:

$a=14$     $d=405$
$b=436$     $e=108$
$c=14$

EXAMPLE 13

Starting products are employed which consist of a prepolymer obtained from 1 equivalent of triol having an equivalent weight of 1500 g. (molecular weight 4500 g.), of 3 equivalents of dimethylene-glycol, and 15 equivalents of 80/20 TDI. Said prepolymer comprises 11 free equivalents of the group —N=C=O and 11 available reactive positions.

The mixture according to the invention is obtained by adding 11 equivalents of dimethylene-glycol which serve as links.

In this case:

$a=15$     $d=322$
$b=473$     $e=53$
$c=11$

EXAMPLE 14

The mixture consists of: 2 equivalents of 4,4'-(2-hydroxyisopropoxyl)phenyl - methane (dialcohol having 2 nuclei), 3 equivalents of 1-2-3-hydroxyisopropoxy propane, 1 equivalent of triol having mainly primary OH terminations, an equivalent weight of 1500 g. (molecular weight of 4500 g.) and 6 equivalents of 80/20 TDI.

$a=10+$     $d=443$
$b=532$     $e=185$
$c=12$

EXAMPLE 15

The mixture consists of: 3 equivalents of dichlorobenzidine (diamine having 2 nuclei), 3 equivalents of Caradol 520 (4 OH functions), 1 equivalent of a triol having mainly primary OH terminations, an equivalent weight of 1500 g. (molecular weight 4500 g.), and 7 equivalents of 80/20 TDI.

$a=13+$     $d=398$
$b=428$     $e=126$
$c=14$

EXAMPLE 16

The mixture consists of: 4 equivalents of trihydroxymethyl-amino-methane, 1 equivalent of tetrafunctional polyol derived from the condensation of propylene oxide and ethylene oxide on ethylene, an equivalent weight of 1875 g. (that is to say a molecular weight of 4×1875 =7500 g.) and 5 equivalents of diphenyl-methane-diisocyanate.

It is apparent from this example, wherein the only nucleus carrier is the basic isocyanate, that:

$a=10+$     $d=539$
$b=539$     $e=30$
$c=10$

EXAMPLE 17

The mixture consists of: 6 equivalents of Jagatin resin (4 nuclei, 6 primary OH, 2 secondary OH), 2 equivalents of triol having mainly primary OH terminations, an equivalent weight of 1500 g. (molecular weight of 4500 g.), and 10 equivalents of 80/20 TDI.

Jagatin resin has an equivalent weight of approximately 156 with there being 8 equivalents per mole.

$a=9+$     $d=511$
$b=570$     $e=156$
$c=20$

EXAMPLE 18

The mixture consists of: 2.06 equivalents of dianisidine (diamine having 2 nuclei) and 0.1 equivalent of water, 1 equivalent of triol having mainly primary OH terminations, an equivalent weight of 1300 g., and 3.2 equivalents of 80/20 TDI.

$a=7$     $d=604$
$b=516$     $e=129$
$c=6$

EXAMPLE 19

The mixture consists of: 8 equivalents of 2-ethyl 1-3 hexanediol serving as a short link, and 1 equivalent of tetrafunctional polyol derived from the condensation of propylene oxide and ethylene oxide on ethylene diamine, an equivalent weight of 1875 g. (that is to say a molecular weight of 4×1875 g.=7500 g.), and 9 equivalents of 80/20 TDI.

It is apparent from this example, in which the sole nucleus-carrier is the basic isocyanate, that $a=9$     $d=360$
$b=720$     $e=73$
$c=18$

EXAMPLE 20

The mixture consists of: 4 equivalents of tri-(hydroxymethyl) aminomethane, 1 equivalent of tetrafunctional polyol derived from the condensation of propylene oxide and ethylene diamine oxide on ethylene, an equivalent weight of 1875 g. (that is to say a molecular weight of $4 \times 1875$ g. $=7500$ g.), and 5 equivalents of diphenylmethane diisocyanate (Caradate 30).

It is seen from this example, in which the sole nucleus carrier is the basic isocyanate, that:

$a=10+$     $d=539$
$b=539$     $e=30$
$c=10$

EXAMPLE 21

The mixture consists of: 2 equivalents of 4,4'-methylene-bis-ortho-chloroaniline (diamine having 2 conjugate nuclei) as nucleus carrier, 2 equivalents of ethyl-aminoethanol as a link, 1 equivalent of triol having mainly primary OH terminations, an equivalent weight of 1666 g. (molecular weight 5000 g.), and 5 equivalents of 80/20 TDI.

$a=9$     $d=491.8$
$b=546$     $e=134$
$c=10$

EXAMPLE 22

The mixture consists of: 2 equivalents of orthonitroparaphenylene diamine (having 1 nucleus), 1 equivalent of triol having mainly primary OH terminations, an equivalent weight of 1300 g., 3 equivalents of diphenylmethane diisocyanate.

$a=8$     $d=624.3$
$b=468$     $e=76.5$
$c=6$

EXAMPLE 23

The starting elements employed are a prepolymer which is obtained from 1 equivalent of triol having an equivalent weight of 1666 g. (molecular weight of 5000 g.) and 8 equivalents of 80/20 TDI. This prepolymer comprises 7 free equivalents of the group —N=C=O and 7 available reactive positions.

The mixture according to the invention is obtained by adding 7 equivalents of propylene glycol-1,2 which serve as links.

We have in this case:

$a=8$     $d=375.4$
$b=657$     $e=38$
$c=14$

EXAMPLE 24

The mixture consists of: 2 equivalents of 4-chloroorthoaminophenol (having 1 nucleus), 1 equivalent of triol having mainly primary OH terminations and having an equivalent weight of 1300 g., 3 equivalents of crude diphenylmethane diisocyanate (Caradate 30).

$a=8$     $d=622$
$b=467.7$     $e=73$
$c=6$

EXAMPLE 25

The mixture consists of: 7 equivalents of propylene glycol-1,2, 1 equivalent of triol having mainly primary OH terminations, an equivalent weight of 1666 g. (molecular weight 5000 g.), and 8 equivalents of 80/20 TDI.

$a=8$     $d=328.5$
$b=657$     $e=38$
$c=16$

EXAMPLE 26

The mixture consists of: 2 equivalents of 4,4'-methylene-bis-ortho-chloroaniline (diamine having 2 conjugate nuclei), 2 equivalents of 1,2 propylene glycol as a link, one equivalent of triol having mainly primary OH terminations, an equivalent weight of 1666 g. (molecular weight 5000 g.), and 5 equivalents of 80/20 TDI.

$a=9$     $d=489$
$b=543.3$     $e=134$
$c=10$

EXAMPLE 27

The mixture consists of: 2 equivalents of 4,4'-methylene-bis-ortho-chloroaniline; 1 equivalent of diethylene glycol-1,2; 1 equivalent of Caradol 520; 1 equivalent of a polyester diol (Desmophen 2100) having a molecular weight of approximately 2680, and an equivalent weight of 1340; and 5 equivalents of TDI 80/20.

$a=9+$     $d=440$
$b=489$     $e=134$
$c=10$

What is claimed is:

1. In a process of producing molded products of polyurethane foam structure, utilizing blowing agent and catalyst materials, by pouring into a mold a single liquid formulation obtained by admixture of:
    (a) organic polyisocyanate constituents which carry at least two NCO group terminations, and
    (b) constituents which carry at least two active hydrogen atoms reactive with the constituents carrying NCO groups, said active hydrogen being in the form of a radical selected from the groups OH, $NH_2$ and NH, the improvement of producing skinned, elastic, flexible, relatively impermeable polyurethane polymer foam parts, having good resistance to tear and plastic deformation, a compact outer skin surface and a cellular internal structure, and a density no less than about 50 grams per cubic decimeter, said improvement being comprised of:
   (1) employing long chain polyols having an equivalent weight per active hydrogen of greater than 750, and being present in the formulation in a proportion of about 5% to about 40% on an equivalents basis of the total NCO groups,
   (2) employing at least one short chain polyfunctional product having at least two active hydrogens and selected from the group consisting of a polyol, a polyamine, an aminated polyol, an amino-alcohol, an amino-acid, an amino-phenol, or water,
       said short chain product having an equivalent weight per active hydrogen of less than 200, and
       being present in the formulation in an amount of about 95% to about 60% on an equivalents basis of the total NCO groups,
   (3) employing a proportion of said water in said short chain product of less than 25% on an equivalents basis,
   (4) employing a ratio of the long chain polyol constituents to the short chain polyfunctional product such that the equivalent weight of the polyurethane per reactive position between free NCO and active hydrogen groups is between about 200 and about 800,
       wherein said NCO carrying constituents and the short chain polyfunctional product material are selected such that there are formed bonds between the long chain polyols comprised of at least six aromatic nuclei,
       and wherein the equivalent weight of the molded polyurethane is between about 300 and about 800 per nucleus.

2. The process of claim 1, wherein said long chain polyol constituents have an equivalent weight per active H comprised between about 750 and about 2,500, the proportion of water is comprised between 0 and about 10% on an equivalents basis of the total NCO terminated constituents and the weight of the constituents of final polyurethane polymer per reactive position between free NCO and active H is comprised between about 400 and about 600.

3. The process of claim 1, wherein said constituents which carry NCO belong to the group comprising polyisocyanates and prepolymers resulting from previous combination of polyisocyanates with carriers of active hydrogens in a quantity which is not sufficient to saturate the entire amount of NCO.

4. The process of claim 1, wherein said liquid is poured immediately after mixing into an appropriate mold having a useful surface temperature which is adjusted to a temperature comprised between about —10° C. and about +70° C.

5. The product obtained by the process according to claim 1.

6. The process of claim 4, wherein said density is from about 50 to about 500 grams per cubic decimeter.

7. The process of claim 1 wherein the mold surface temperature is about 20° C. to about 55° C.

8. The process of claim 1 wherein the short chain polyfunctional product is comprised of methylene-bis-orthochloroaniline.

9. The process of claim 1 wherein the short chain polyfunctional product is comprised of 2-amino, 2-methyl, 1-propanol.

10. The process of claim 1 wherein the short chain polyfunctional product is selected from at least one of the group consisting of
methylene-bis-orthochloroaniline;
di-(aminophenyl)sulfone; dichlorobenzidine;
phenylethanolamine;
ortho-nitro-paraphenylene;
ethylene glycol; diethylene glycol;
neopentylglycol; butyl tartrate;
thiodiethylene glycol;
trihydroxy-ethyl ether of glycerol;
4,4'-(2-hydroxyisopropoxy)phenyl-methane;
1,2,3-hydroxyisopropoxy propane;
tri-hydroxy methyl amino methane;
dianisidine; 2-ethyl-1-3 hexanediol;
tri-(hydroxymethyl)amino-methane;
ethyl-aminoethanol; propylene glycol-1,2;
4-chloro-orthoaminophenol; and
3-amino-2-methyl-1-propanol.

11. The process of claim 1 further characterized in that said polyol is comprised of a diol type material.

12. The process of claim 11 wherein the mold surface temperature is about 20° C. to about 70° C.

13. The process of claim 1 wherein said short chain polyfunctional product is comprised at least in part of a thiol type material.

14. The process of claim 1 further characterized in that said formulation includes a silicone surface active agent.

15. The process of claim 1 wherein said short chain polyfunctional product is comprised of at least one polyol.

16. The process of claim 1 wherein said short chain polyfunctional product is selected from one or more of the group consisting of a polyamine, an aromatic diamine, and an amino alcohol.

17. The process of claim 8 wherein the mold surface temperature is about 20° C. to about 70° C.

18. The process of claim 9 wherein the mold surface temperature is about 20° C. to about 70° C.

19. The process of claim 10 wherein the mold surface temperature is about 20° C. to about 70° C.

20. The process of claim 16 wherein the mold surface temperature is about 20° C. to about 70° C.

21. The process of claim 1 wherein said density is from about 50 to about 500 grams per cubic decimeter.

22. The process of claim 21 wherein the mold surface temperature is about 20° C. to about 70° C.

23. The process of claim 22 wherein the short chain polyfunctional product is selected from at least one of the group consisting of
methylene-bis-orthochloroaniline;
di-(aminophenyl) sulfone;
dichlorobenzidine;
phenylethanolamine;
ortho-nitro-paraphenylene diamine;
ethylene glycol; diethylene glycol;
neopentyl glycol; butyl tartrate;
thiodiethylene glycol;
trihydroxy-ethyl ether of glycerol;
4,4'-(2-hydroxyisopropoxy) phenyl-methane;
1,2,3-hydroxyisopropoxy propane;
tri-hydroxy methyl amino methane;
dianisidine; 2-ethyl-1-3 hexanediol;
tri-(hydroxymethyl)amino-methane;
ethyl-aminoethanol; propylene glycol-1,2;
4-chloro-orthoaminophenol; and
3-amino-2-methyl-1-propanol.

24. The process of claim 22 wherein said short chain polyfunctional product is selected from one or more of the group consisting of a polyamine, an aromatic diamine, and an amino alcohol.

25. The process of claim 22 wherein the short chain polyfunctional product is comprised of methylenebis-orthochloroaniline.

26. The process of claim 22 wherein the short chain, polyfunctional product is comprised of 2-amino-2-methyl-1-propanol.

27. The process of claim 14 wherein said density is from about 50 to about 500 grams per cubic decimeter.

28. The process of claim 27 wherein the mold surface temperature is about 20° C. to about 70° C.

29. A product by the process of claim 28.

30. The process of claim 2 wherein said density is from about 50 to about 500 grams per cubic decimeter, and, the mold surface temperature is about 20° C. to about 70° C.

31. The process of claim 3 wherein said density is from about 50 to about 500 grams per cubic decimeter, and, the mold surface temperature is about 20° C. to about 70° C.

32. In a process of producing molded products of polyurethane foam structure, utilizing blowing agent and catalyst materials, by pouring into a mold a single liquid formulation obtained by admixture of
(a) organic polyisocyanate constituents which carry at least two NCO group terminations, and
(b) constituents which carry at least two active hydrogen atoms reactive with the constituents carrying NCO groups, said active hydrogen being in the form of a radical selected from the groups OH, NH$_2$ and and NH, the improvement of producing skinned, elastic, flexible, relatively impermeable polyurethane polymer foam parts, having good resistance to tear and plastic deformation, a compact outer skin surface and a cellular internal structure, and a density of about 50 up to about 500 grams per cubic decimeter,
said improvement being comprised of
(1) employing long chain polyols having an equivalent weight per active hydrogen of greater than 750, and
being present in the formulation in a proportion of about 5% to about 40% on an equivalents basis of the total NCO groups,
(2) employing at least one short chain polyfunctional product having at least two active hydrogens and being comprised of at least one polyol, said short chain product having an equivalent weight per active hydrogen of less than 200, and being present in the formulation in an amount of about 95% to about 60% on an equivalents basis of the total NCO groups, (3) employing a proportion of water in said short chain product of less than 25% on an equivalents basis, (4) employing a ratio of the long chain polyol constituents to the short chain polyfunctional product such that the equivalent weight of the polyurethane per reactive position between free NCO and active hydrogen groups is between about 200 and about 800, wherein said NCO carrying constituents and the short chain polyfunctional product material are selected such that there are formed bonds between the long chain polyols comprised of at least six aromatic nuclei, and wherein the equivalent weight of the molded polyurethane is between about 300 and about 800 per nucleus, said process being carried out at a mold surface temperature of about −10° C. to about 70° C.

33. The process of claim 32 further characterized in that said formulation includes a silicone surface active agent.

34. The process of claim 32 wherein the mold surface temperature is about 20° C. to about 70° C.

35. The product obtained by the process according to claim 32.

References Cited

UNITED STATES PATENTS

| | | | |
|---|---|---|---|
| 3,099,516 | 7/1963 | Henrickson | 18—48 |
| 3,108,976 | 10/1963 | Knox | 260—2.5 |
| 3,133,978 | 5/1964 | Bartley et al. | 264—45 |
| 3,296,156 | 1/1967 | Carter | 260—9 |

DONALD E. CZAJA, Primary Examiner

M. J. WELSH, Assistant Examiner

U.S. Cl. X.R.

264—48